(12) United States Patent
Moon

(10) Patent No.: US 6,310,666 B1
(45) Date of Patent: Oct. 30, 2001

(54) MANUFACTURING METHOD OF LIQUID CRYSTAL DISPLAY PREVENTING RF DISCHARGE DAMAGE

(75) Inventor: Kyo Ho Moon, Kyungsangbook-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/038,823

(22) Filed: Mar. 12, 1998

(30) Foreign Application Priority Data

Oct. 24, 1997 (KR) ................................................ 97-54963

(51) Int. Cl.[7] ................................................ G02F 1/1333
(52) U.S. Cl. ................................ 349/40; 349/43; 445/24; 345/92
(58) Field of Search ..................................... 438/149, 151, 438/59; 257/62, 59, 291; 349/40–43, 139, 54, 46, 147, 122; 345/87, 205–206, 92; 445/24–25

(56) References Cited

U.S. PATENT DOCUMENTS

| 5,352,907 | * | 10/1994 | Matsuda et al. | 257/59 |
|---|---|---|---|---|
| 5,475,246 | * | 12/1995 | Wei et al. | 257/291 |
| 5,620,905 | * | 4/1997 | Konuma et al. | 438/163 |
| 5,668,032 | * | 9/1997 | Holmberg et al. | 438/144 |
| 5,731,856 | * | 3/1998 | Kim et al. | 349/43 |
| 5,757,030 | * | 5/1998 | Codama et al. | 257/66 |
| 5,798,744 | * | 8/1998 | Tanaka et al. | 345/92 |
| 5,828,083 | * | 10/1998 | Jun | 257/59 |
| 5,828,428 | * | 10/1998 | Kim et al. | 349/40 |
| 5,883,682 | * | 3/1999 | Kim et al. | 349/43 |
| 5,926,702 | * | 7/1999 | Kwon et al. | 438/158 |
| 6,128,051 | * | 10/2000 | Kim et al. | 349/40 |

FOREIGN PATENT DOCUMENTS 5-113580    5/1993  (JP) .

* cited by examiner

Primary Examiner—Richard Hjerpe
Assistant Examiner—Francis Nguyen

(57) ABSTRACT

A method for manufacturing a liquid crystal display device, includes the steps of forming a gate line, a gate pad at an end of the gate line, and a gate shorting bar connected to the gate pad on a substrate, wherein the gate shorting bar is offset from an edge of the substrate, and depositing a gate insulation layer completely covering the gate line, the gate pad, and the gate shorting bar.

18 Claims, 6 Drawing Sheets

MANUFACTURING METHOD OF LIQUID CRYSTAL DISPLAY PREVENTING RF DISCHARGE DAMAGE

This application claims the benefit of Korean patent application No. 97-54963, filed Oct. 24, 1997, which is hereby incorporated by reference.

BACKGROUND OF THE INVENTION

1. Field of the Invention

The present invention relates to a method for manufacturing a liquid crystal display (LCD) device including a thin film transistor (TFT), and more particularly, to a method for protecting the TFT from damage due to radio frequency discharge during dry etching.

2. Discussion of the Related Art

As shown in FIG. 1, a conventional liquid crystal display (LCD) device includes two panels and a liquid crystal layer between them. The first panel (an active panel) includes a plurality of gate lines 70 on a transparent substrate 10, a gate pad 75 at an end of each gate line 70, and a gate shorting bar 76 connecting to each gate pad 75 at an edge portion of the transparent substrate 10. The conventional LCD further includes a plurality of a data lines 80 crossing the gate lines 70 and substantially perpendicular to the gate lines 70, a data pad 85 at an end of each data line 80, and a data shorting bar 86 connecting each data pad 85 at another edge portion of the transparent substrate 10. The conventional LCD further includes a pixel electrode 40 located at an area surrounded by two neighboring gate lines 70 and two neighboring data lines 80, and a thin film transistor TFT 31 connected to the pixel electrode 40 near an intersection of the gate line 70 and the data line 80. The TFT 31 includes a gate electrode 70a extended from the gate line 70, a source electrode 80a extended to form the data line 80, a drain electrode 80b facing the source electrode 80a, and a semiconductor layer 90 between the gate electrode 70a and the source and drain electrodes 80a and 80b.

The second panel (a color filter panel) (not shown), includes a color filter, a black matrix, and a common electrode on a second transparent substrate. Before the first and second panels are joined each other, the gate shorting bar 76 and the data shorting bar 86 are removed by cutting them or etching the transparent substrate 10 along line I—I of FIG. 1.

The gate shorting bar 76 and the data shorting bar 86 are used for anodizing the gate line 70 and gate electrode 70a, or for testing the TFT 31.

A method for manufacturing the active panel of the LCD will be described with reference to FIGS. 2A to 2D showing cross-sectional views along line II—II of FIG. 1.

As shown in FIG. 2A, a metal such as aluminum is deposited on a transparent substrate 10 and patterned to form the gate line 70, the gate electrode 70a extending from the gate line 70, and the gate shorting bar 76. The gate shorting bar 76 generally covers the edge portion of the transparent substrate 10. A gate insulation layer 50, including silicon nitride ($SiN_x$) or silicon oxide ($SiO_x$), is formed on the gate electrode 70a and the gate shorting bar 76. A semiconductor layer 90, including amorphous silicon (a-Si), and doped semiconductor layers 92a and 92b, including impurity doped amorphous silicon ($n^+$ a-Si), are formed sequentially on the gate insulation layer 50. The data line 80, including chromium, is formed on the gate insulation layer 50. The source electrode 80a is formed extending from the data line 80 and in ohmic contact with the doped semiconductor layer 92a, and the drain electrode 80b is formed facing the source electrode 80a and in ohmic contact with the doped semiconductor layer 92b.

Not shown in the cross-sectional view is that the data pad 85 is formed at the end of the data line 80. The data pad 85 is connected to the data shorting bar 86 located on the edge of the transparent substrate 10, as shown in FIG. 1. The data pad 85 and the gate shorting bar 86 can be formed simultaneously with the data bus line 80. Alternatively, they can be formed simultaneously with the gate line 70 and can connect to the data line 80 through a contact hole (not shown) formed in the gate insulation layer 50.

A protection layer 55 including silicon nitride, silicon oxide, or benzo-cyclo-butene (BCB), is deposited covering the transparent substrate 10 and the TFT 31.

A photo-resist layer is coated on the protection layer 55 by a spin coating method. The photo-resist layer is patterned using a mask to form a photo-resist pattern 60 that exposes a portion of the protection layer 55 covering the drain electrode 80b, as shown in FIG. 2B. The edge of the gate shorting bar 76 is exposed even if the gate insulation layer 50, the protection layer 55, and the photo-resist pattern 60 cover the entire surface of the transparent substrate 10. The LCD panel, as shown in FIG. 2B, is placed in an etching chamber. The protection layer 55 is etched along with the photo-resist pattern 60 using a dry etching method in which a gas such as $SF_6$ or $CF_4$ is brought to a plasma state using a radio frequency (RF) generator. The Si radical of the exposed part of the protection layer 55 reacts with the plasma gas because the protection layer 55 includes $SiN_x$, $SiO_x$, or BCB. A volatile material, such as, $SiF_4$, results when removing the exposed portion of the protection layer 55 from the surface of the transparent substrate 10.

During the etching process using a radio frequency discharge, the TFTs 31 can be damaged by static electricity resulting from charges stored at an exposed edge of the gate shorting bar 76. Furthermore, after the etching processing is finished, the etched shape can be different from what was intended. For example, as shown in FIG. 2C, the contact hole 37 over the drain electrode 80b does not have the desired shape. Additionally, the photo-resist pattern 60 is not removed entirely, and photo-resist remnants 60' will remain on some portions of the protection layer 55.

An indium tin oxide (ITO) layer is deposited over the protection layer 55 and patterned to form a pixel electrode 40 in contact with the drain electrode 80b through the contact hole 37. However, as shown in FIG. 2D, contact condition of the pixel electrode 40 with the drain electrode 80b is poor because the contact hole 37 does not have the desired shape. Additionally, the pixel electrode 40 does not settle on the protection layer 55 due to the photo-resist remnant 60', so a portion of the pixel electrode can wear off.

Finally, the active panel is cut along line I—I shown in FIG. 1 to remove the portion having the gate shorting bar 76 and data shorting bar 86. The removing method uses either mechanical cutting or etching.

SUMMARY OF THE INVENTION

Accordingly, the present invention is directed to a method for manufacturing a liquid crystal display device that substantially obviates one or more of the problems due to the limitations and disadvantages of the related art.

One object of the present invention is to protect the TFTs from radio frequency discharge during dry etch processing.

Another object of the present invention is to form an etched shape as intended by preventing static electricity on the etched surface.

Another object of the present invention is to produce a clean surface without any photo-resist remnants after the dry etch process is finished.

Additional features and advantages of the present invention will be set forth in the description which follows, and will be apparent from the description, or may be learned by practice of the invention.

The objectives and other advantages of the invention will be realized and attained by the structure and process particularly pointed out in the written description as well as in the appended claims.

To achieve these and other advantages and in accordance with the purpose of the present invention, as embodied and broadly described, in accordance with one aspect of the present invention there is provided a method for manufacturing a liquid crystal display device, including the steps of forming a gate line, a gate pad at an end of the gate line, and a gate shorting bar connected to the gate pad on a substrate, wherein the gate shorting bar is offset from an edge of the substrate, and depositing a gate insulation layer covering the gate line, the gate pad, and the gate shorting bar.

In another aspect of the present invention, there is provided a method for manufacturing a liquid crystal display device, including the steps of forming a gate data line, a gate data pad at an end of the gate data line, a gate and a data shorting bar connected to the gate pad, data pad, and a data shorting bar connected to the data pad on a substrate, and depositing a gate insulation protection layer entirely covering the gate data line, the gate data pad, and the data shorting bar.

In another aspect of the present invention there is provided a method of forming a liquid crystal display device, including the steps of forming a gate electrode, a gate line connected to the gate electrode, a gate pad connected to the gate line, and a gate shorting bar connected to the gate pad on a substrate, wherein the gate shorting bar is offset from an edge of the substrate, forming a gate insulation layer over the gate electrode, the gate line, the gate pad and the gate shorting bar, and an area of the substrate between the gate shorting bar and the edge of the substrate, forming a semiconductor layer over the gate insulation layer and over the gate electrode, forming, forming a source electrode and a source drain electrode over the semiconductor layer and a drain electrode over the gate insulation layer, the gate electrode and facing the source electrode over the semiconductor layer, and forming a protection layer over the gate insulation layer, the source electrode and the drain electrode.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
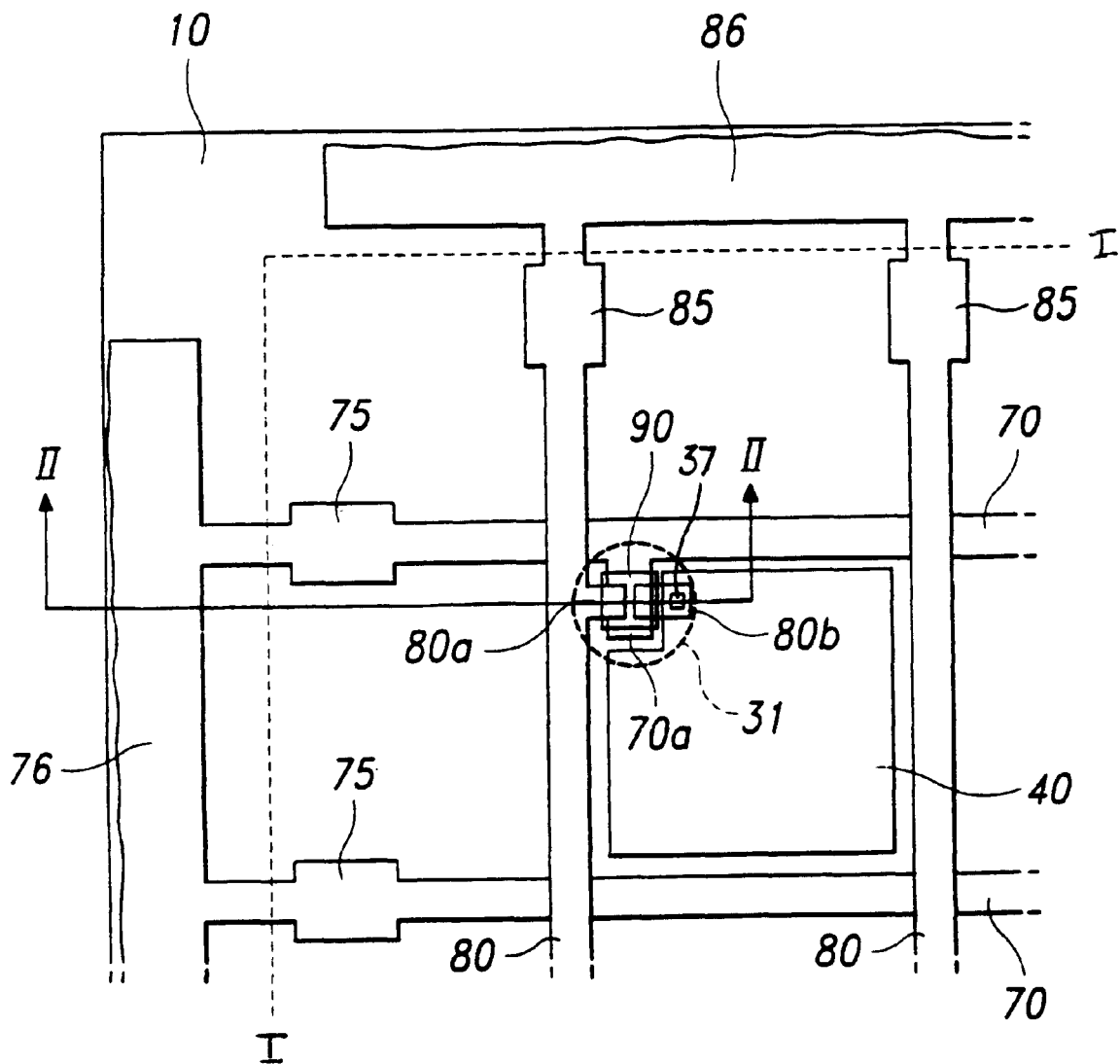
FIG. 1 is a plan view showing a conventional structure of a liquid crystal display device.
Figure 2A:
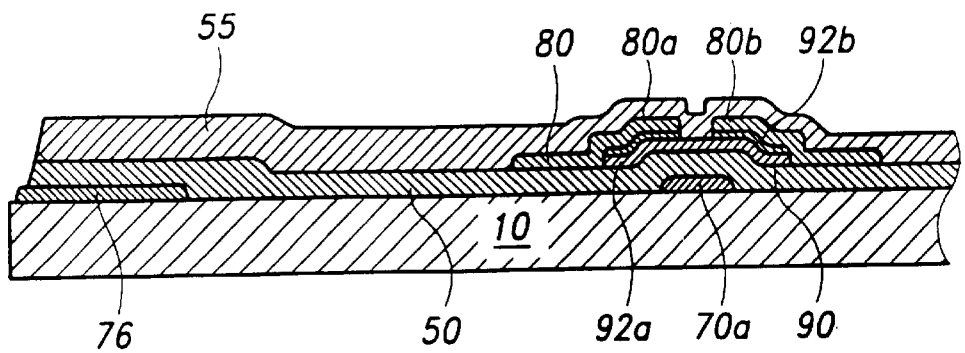
FIGS. 2A–2D are cross-sectional views showing a conventional method for manufacturing the liquid crystal display device.
Figure 2B:
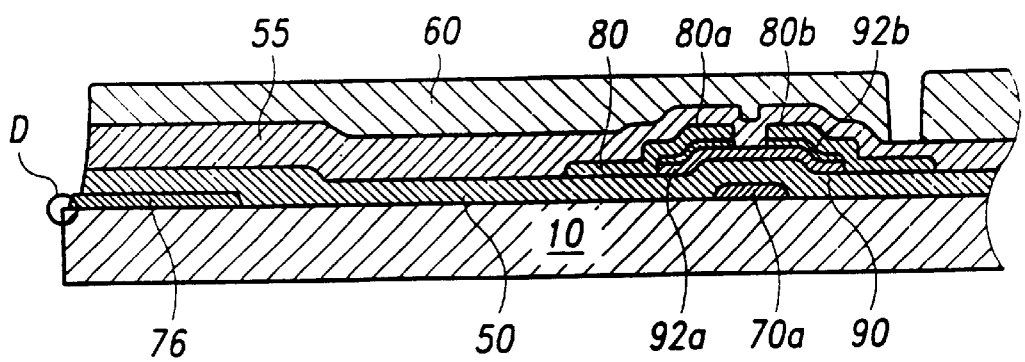
Figure 2C:
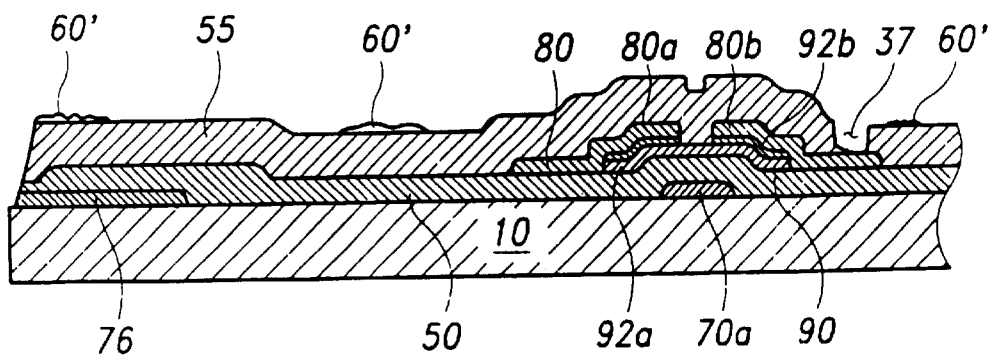
Figure 2D:
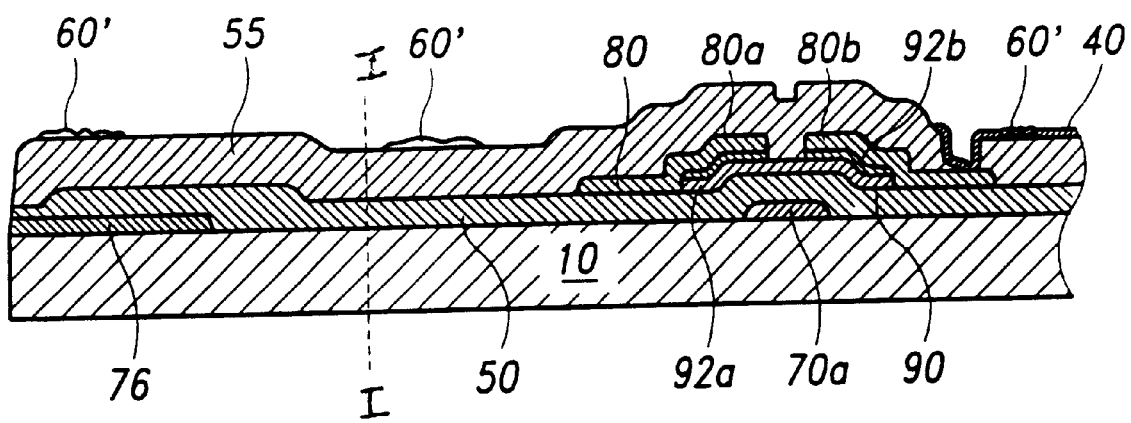
Figure 3:
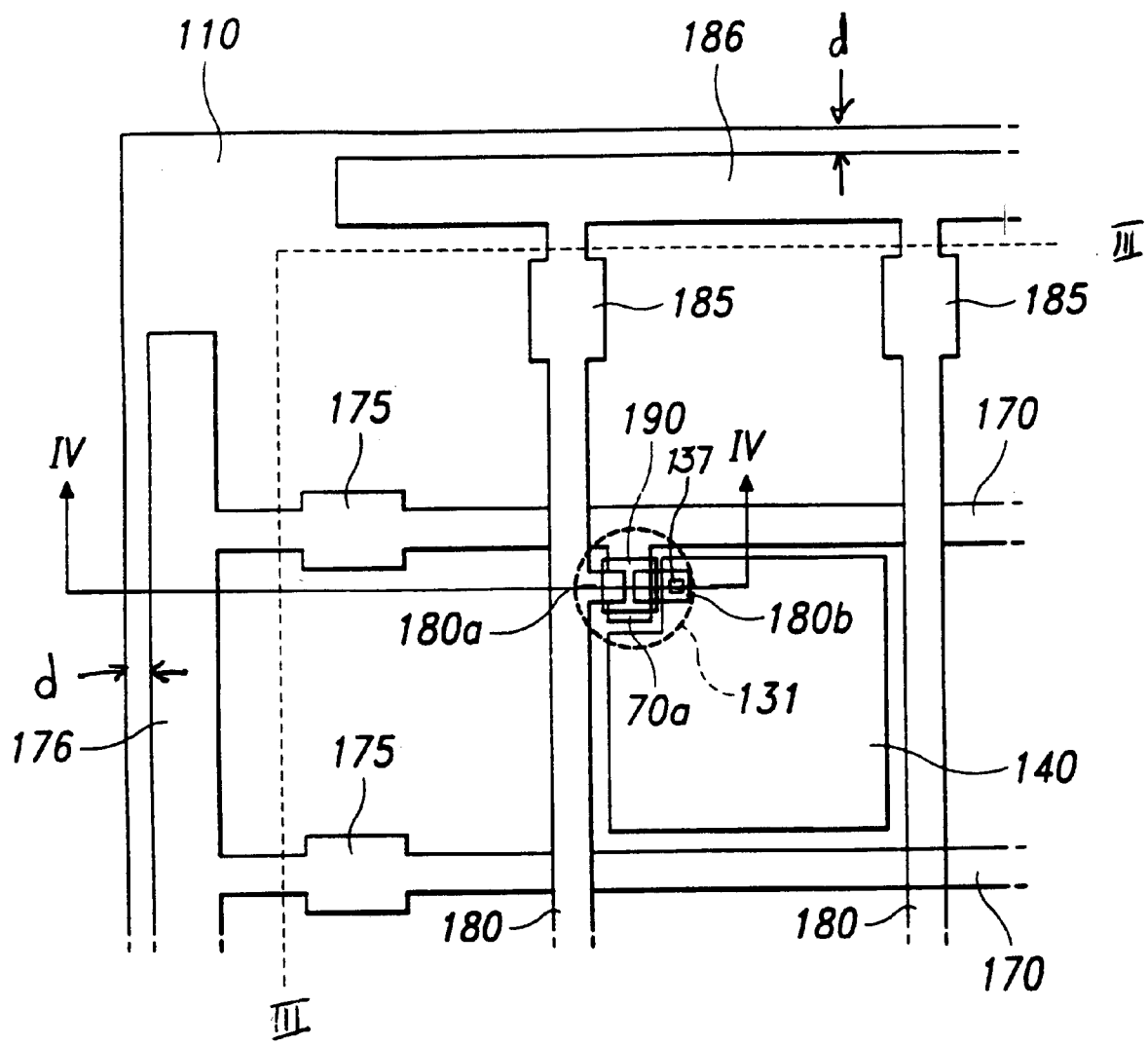
FIG. 3 is a plan view showing a structure of a liquid crystal display device according to the present invention.

Referring to FIG. 3, showing a plan view of an active panel of an LCD, and FIGS. 4A–4D, showing cross-sectional views along line IV—IV of FIG. 3, a method for manufacturing a liquid crystal display device according to the present invention will be described.

Figure 4A:
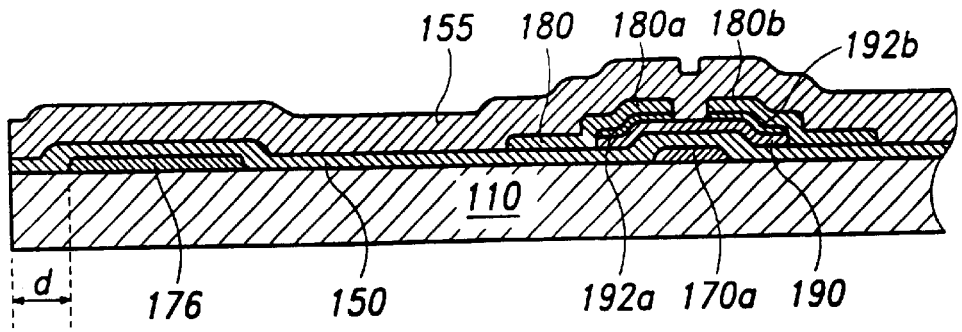
FIGS. 4A–4D are cross-sectional views showing a method for manufacturing the liquid crystal display device according to the present intention.

A first metal, such as aluminum, is deposited on a substrate 110 to form a first metal layer. The first metal layer is patterned to form a gate line 170, a gate electrode 170a extending from the gate line 170, and a gate shorting bar 176. The gate shorting bar 176 is located a distance d away from an edge of the substrate 110, as shown in FIG. 3 and FIG. 4A. A gate insulation layer 150, including one of silicon nitride and silicon oxide, is deposited on the substrate 110. A semiconductor layer 190, including amorphous silicon, is deposited on the gate insulation layer 150 over the gate electrode 170a. Doped semiconductor layers layer 192a and, 192b including impurity doped amorphous silicon, are is formed on the semiconductor layer 190. A second metal, such as chromium, is deposited to form a second metal layer. The second metal layer is patterned to form a data line 180, a data pad 185 at an end of the data line 180, a data shorting bar 186 connected to the data pad 185, a source electrode 180a extending from the data line 180, and a drain electrode 180b facing the source electrode 180a. The data shorting bar 186 is located approximately a distance d from an edge of the substrate, similar to the gate shorting bar 176, as shown in FIG. 3. The source electrode 180a is in ohmic contact to the doped semiconductor layer 192a, and the drain electrode 180b is in ohmic contact to the doped semiconductor layer 192b. A protection layer 155, including one of silicon nitride, silicon oxide, and benzo-cyclo-butene (BCB), is deposited on the substrate 110.

In order to form a contact hole in the protection layer 155 so as to expose a portion of the drain electrode 180b, a photo-resist layer is coated on the protection layer 155 using spin coating method. The photo-resist layer is exposed to ultraviolet light using a mask having a contact hole pattern, and developed to form a photo-resist pattern 160 having the contact hole pattern exposing the portion of the protection layer 155 covering the drain electrode 180b, as shown in FIG. 4B.

Figure 4B:
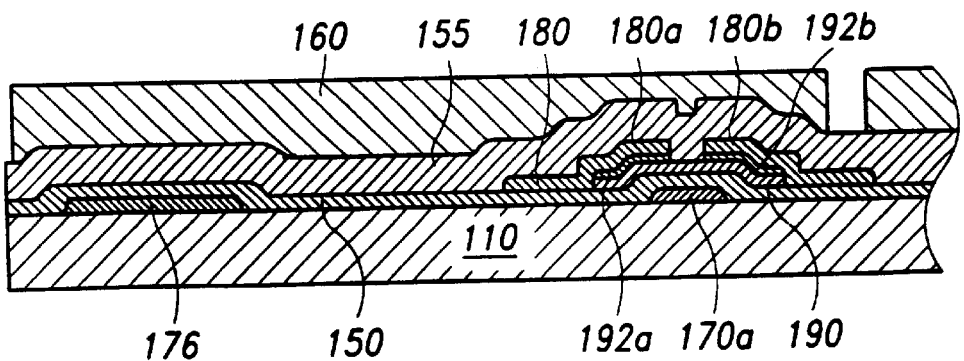
Figure 4C:
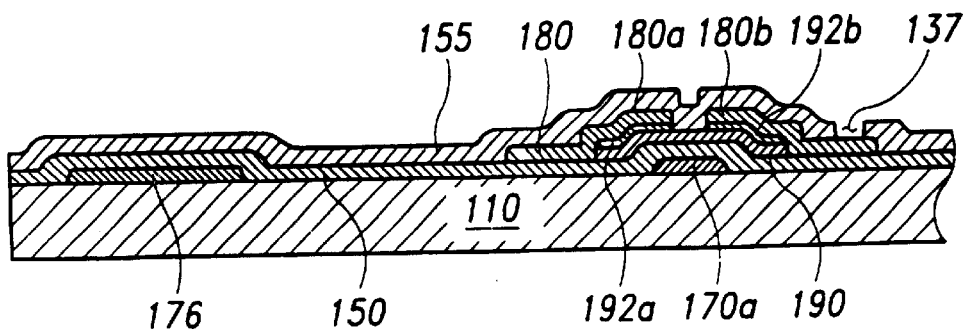

In order to remove the exposed portion of the protection layer 155 according to the photo-resist pattern 160, as shown in FIG. 4B, the LCD panel is placed in an etching chamber and the exposed portion of the protection layer 155 is etched by a plasma gas, including $SF_6$ or $CF_4$, which is brought to a plasma state using a radio frequency (RF) generator. Because the protection layer 155 includes one of silicon nitride, silicon oxide, and BCB, which have an Si radical, the protection layer 155 and the plasma gas react, generating a volatile material such as a $SiF_4$ gas. This reaction begins removing removes the exposed portion of the protection layer 155 from a surface of the gate insulation layer 150, the source electrode 180a and the drain electrode 180b. In the present invention, the metal layers, such as the gate shorting bar 176 and the data shorting bar 186, are entirely covered by the gate insulation layer 150 and/or the protection layer 155 so that they are not exposed to radio frequency discharge. These layers, therefore, remain in good condition after etching. For example, as shown in FIG. 4C, the contact hole 137 has a desired shape and there are no photo-resist remnants on the protection layer 155. Additionally, the TFTs are protected from static electricity resulting from the radio frequency discharge.

Figure 4D:
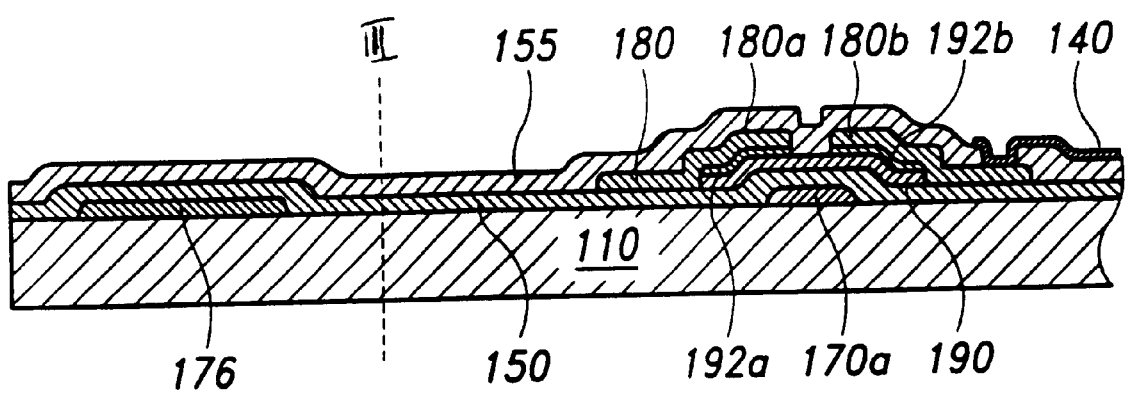

Finally, a conductive material, such as indium tin oxide, is deposited on the entire surface of the substrate 110 and the TFTs to form a conductive layer. The conductive layer is patterned to form a pixel electrode 140 on the protection layer 155. The pixel electrode 140 connects is connected to the drain electrode 180*b* through the contact hole 137, as shown in FIG. 4D. The LCD panel is then cut along a cutting line IV—IVIII—III shown in FIGS. 3 and 4D to remove portions having the gate shorting bar 176 and the data shorting bar 186. The removing method uses either mechanical cutting or etching.

Although in the preferred embodiment the gate shorting bar 176 and the data shorting bar 186 are formed in separate layers, the data shorting bar 186 and the data pad 185 can be formed in the same layer as the gate shorting bar 176. After that, the data line 180 can connect to the data pad 185 through a contact hole formed in the gate insulation layer 150 covering the data pad 185.

In the preferred embodiment, the protection layer 155 is patterned to form the contact hole 137 to expose the drain electrode 180*b*. However, when a semiconductor layer and/or a doped semiconductor layer is formed, a dry etching method may be used to pattern the protection layer 155. In that case, an etchant gas, such as $SF_6$ or $CF_4$, can be used, and a radio frequency generator converts the etchant gas to a plasma Here, the metal layer, including the gate shorting bar 176 and/or the data shorting bar 186, is covered by the gate insulation layer 150 so that the plasma does not damage the TFTs and the etching result is good. In other words, the present invention can be used to form a layer using a dry etching method, wherein all the elements are protected from the radio frequency discharge. Moreover, this method is used when fine etching results are needed.

In the present invention, the gate shorting bar 176 and the data shorting bar 186 are offset from the edge of the substrate, and so that all metal layers are entirely covered by the insulation layer, such as a gate insulation layer 150 and/or a protection layer 155. Therefore, all the metal layers can be isolated and protected from the plasma discharge, radio frequency discharge, resulting in protecting the TFTs are not from being damaged by the static electricity from the radio frequency discharge, or the etched shape is formed as intended and is cleaned without any photo-resist remnants of its surface radio frequency discharge. The result is further, the etched shape is formed as intended and is clear of any photo-resist remnants of its surface, resulting in a good contact condition of all deposited elements.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for manufacturing a liquid crystal display device, comprising the step of:
    forming a gate electrode and a gate line on a substrate;
    forming a gate pad at an end of the gate line;
    forming a gate shorting bar connected to the gate pad; and
    depositing a gate insulation layer on the gate electrode, the gate line, the gate pad, and the gate shorting bar,
    wherein the gate shorting bar is formed a distance away from an edge of the substrate so that the gate insulation layer completely covers all portions of the gate line, the gate pad, and the gate shorting bar, which are above the substrate.

2. The method of claim 1, further including the steps of:
    forming a semiconductor layer over the gate insulation layer and over the gate electrode;
    forming a doped semiconductor layer on the semiconductor layer;
    forming a source electrode on the doped semiconductor, a data line extending from the source electrode, a data pad at an end of the data line, a data shorting bar connected to the data pad, and a drain electrode facing the source electrode connected to the doped semiconductor layer;
    forming a protection layer covering the data line, the data pad, the data shorting bar, the source electrode, and the drain electrode;
    forming a contact hole in the protection layer exposing a portion of the drain electrode; and
    forming a pixel electrode connected to the drain electrode through the contact hole,
    wherein the protection layer completely covers the data line, the data pad, the data shorting bar, the source electrode, and the drain electrode.

3. The method of claim 2, wherein outer edges of the gate shorting bar and the data shorting bar are formed a distance away from the edge of the substrate.

4. The method of claim 1, wherein the step of depositing a gate insulation layer includes forming a layer selected from the group consisting of silicon nitride and silicon oxide.

5. The method of claim 2, wherein the step of forming a protection layer includes forming a layer selected from the group consisting of silicon nitride, silicon oxide, and benzo-cyclo-butene.

6. The method of claim 2, wherein the step of forming a contact hole includes a step of etching the protection layer with an etchant gas selected from the group consisting of $SF_6$ and $CF_4$ and converted to a plasma state by use of a radio frequency generator.

7. A method for manufacturing a liquid crystal display device, comprising the steps of:
    forming a gate electrode, a gate line, a gate pad at an end of the gate line, a gate shorting bar connected to the gate pad, a data pad, and a data shorting bar connected to the data pad on a substrate; and
    depositing a gate insulation layer,
    wherein the gate shorting bar and the data shorting bar are formed a distance away from an edge of the substrate, and the gate insulation layer completely covers all portions of the gate line, the gate pad, the gate shorting bar, the data pad, and the data shorting bar, which are above the substrate.

8. The method of claim 7, further including the steps of:
    forming a semiconductor layer on the gate insulation layer over the gate electrode;

forming a doped semiconductor layer on the semiconductor layer;

etching the gate insulation layer to form a data contact hole exposing a portion of the data pad;

forming a data line connected to the data pad through the data contact hole, a source electrode extending from the data line and in contact with the doped semiconductor layer, and a drain electrode facing the source electrode and in contact with the doped semiconductor layer;

forming a protection layer completely covering the source electrode, the drain electrode, the data line, the data pad, the data shorting bar, the gate electrode, the gate line, the gate pad, and the gate shorting bar;

forming a contact hole in the protection layer exposing a portion of the drain electrode; and forming a pixel electrode connected to the drain electrode through the contact hole.

9. The method of claim 8, wherein the step of forming a contact hole includes a step of etching the protection layer with an etchant gas selected from the group consisting of $SF_6$ and $CF_4$ and converted to a plasma state by use of a radio frequency generator.

10. The method of claim 8, wherein the step of forming a protection layer includes forming a layer selected from the group consisting of silicon nitride, silicon oxide, and benzo-cyclo-butene.

11. The method of claim 7, wherein the step of depositing a gate insulation layer includes forming a layer selected from the group consisting of silicon nitride or silicon oxide.

12. The method of claim 7, wherein the step of forming a gate line, a gate pad at the end of the gate line, a gate shorting bar connected to the gate pad, a data pad, and a data shorting bar connected to the data pad on the substrate further includes forming the gate shorting bar and the data shorting bar distance away from the edge of the substrate.

13. A method of forming a liquid crystal display device, comprising the steps of:

forming a gate electrode, a gate line connected to the gate electrode, a gate pad connected to the gate line, and a gate shorting bar connected to the gate pad on a substrate, wherein the gate shorting bar is formed a distance away from an edge of the substrate;

forming a gate insulation layer completely covering all portions of the gate electrode, the gate line, the gate pad, the gate shorting bar, and an area of the substrate between the gate shorting bar and the edge of the substrate, which are above the substrate;

forming a semiconductor layer over the gate insulation layer and over the gate electrode;

forming a source electrode and a drain electrode over the semiconductor layer, wherein the drain electrode faces the source electrode; and forming a protection layer over the gate insulation layer, the source electrode and the drain electrode.

14. The method of claim 13, further including the step of forming a pixel electrode over the protection layer and in contact with the drain electrode.

15. The method of claim 14, wherein the step of forming a pixel electrode over the protection layer and in contact with the drain electrode includes forming a contact hole in the protection layer over the drain electrode.

16. The method of claim 13, further including the step of forming a data line connected to the source electrode, a data pad connected to the data line, and a data shorting bar connected to the data pad, wherein the data shorting bar is formed a distance away from an edge of the substrate.

17. The method of claim 16, wherein the protection layer completely covers the date line, the data pad, the data shorting bar, and an area between the data shorting bar and the edge of the substrate.

18. The method of claim 13, wherein the step of forming a semiconductor layer over the gate insulation layer and over the gate electrode includes forming an undoped semiconductor layer and a doped semiconductor layer over the undoped semiconductor layer.

* * * * *